Figure 1:
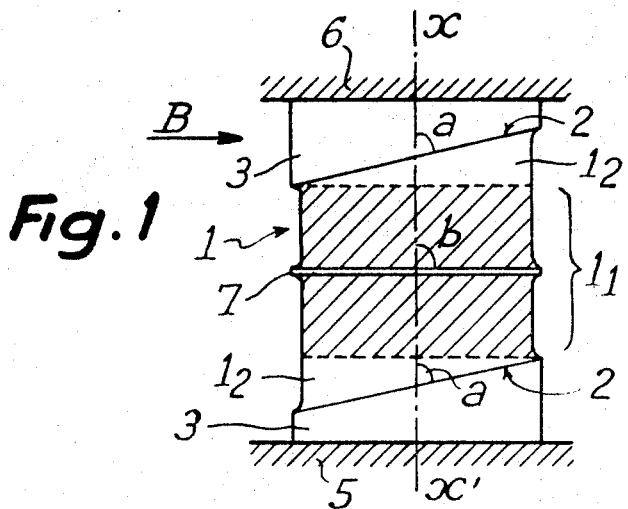

United States Patent

[11] 3,593,981

[72] Inventors Joachim Tank
 Paris, France;
[73] Assignee Pneumatiques, Caoutchouc Manufacture et Plastiques Pleber-Colombes, Colombes, France
[21] Appl. No. 809,193
[22] Filed Mar. 21, 1969
[45] Patented July 20, 1971
[32] Priority Mar. 26, 1968
[33] France
[31] 145,514

[54] RUBBER COMPRESSION SPRINGS
 7 Claims, 6 Drawing Figs.
[52] U.S. Cl. .................................................. 267/153
[51] Int. Cl. .................................................. F16f 1/40
[50] Field of Search .......................................... 267/141, 140, 152, 153, 63, 143, 145, 182

[56] References Cited
UNITED STATES PATENTS
3,416,783 12/1968 Tondato ........................ 267/152
FOREIGN PATENTS
1,148,718 5/1963 Germany ...................... 263/121

Primary Examiner—James B. Marbert
Attorney—Holcombe, Wetherill & Brisebois

ABSTRACT: This invention relates to rubber compression springs, of the kind in which at least one rubber block is fixed at its ends to bearing surfaces which are inclined with respect to the longitudinal axis of the block so that the block supports the load whilst functioning primarily in compression. In accordance with the invention, the block is subdivided by one or more intermediate plates which are inclined to the axis of the block at an angle greater than that of the bearing surfaces. This arrangement allows the lateral rigidity of the spring to increase when the spring is compressed, at least in a transverse direction.

RUBBER COMPRESSION SPRINGS

The present invention relates to rubber compression springs of the sandwich type comprising layers of rubber adhered to metal plates with parallel ends and to one or more intermediate metal plates, the assembly forming an elastic block which is cylindrical or parallelepipedal with a foliated structure and has for an object, improvements in such springs. A spring of this type is usually used as an elastic or resilient support to support a load or a vertical stress, the rubber thus working under compression between the metal plates. The spring can also work under shear when a horizontal stress is added to the main compressive stress, due for example to a horizontal displacement of the supported load.

It is known that the resilience of springs is larger under shear than under compression so that for a predetermined stress, the spring yields less under compression when the stress is exerted vertically than under shear when the stress is exerted horizontally. It is also known that the rigidity in the horizontal direction, that is to say under shear, decreases more as the spring is compressed vertically and that it may even become negative, the spring thus being unstable. This may be a serious drawback in certain uses, for example when the spring is used to support the body of a vehicle while ensuring both a predetermined vertical and horizontal compliance, because it is usually desired that the horizontal resilience shall not vary substantially and above all shall not increase at the same time as the load is increasing.

In certain cases, by using V- or chevron-shaped springs having bearing surfaces inclined with respect to the vertical direction of the load, a large degree of vertical resilience can be obtained by making the rubber work under the combined forces of shear and compression but principally under shear, between the inclined bearing or support surfaces. However, with such V- or chevron-shaped springs, the transverse horizontal resilience is very limited and it may be insufficient because the rubber thus works primarily under compression between the inclined bearing or support surfaces. These springs are thus not suitable when a weak vertical resilience and a relatively large horizontal resilience is desired. In order to achieve this, the V-surfaces would need to have a large included angle, for example, approximately 120°, so that the rubber works principally under compression in a vertical direction, but again it would be found that the compression springs, namely a decrease in the horizontal rigidity under increasing compressive load.

The invention consists in a rubber compression spring comprising a rubber block which is of cylindrical or parallelepipedal form, resting on end surfaces which are inclined with respect to the axis of the block so that the block supports the load while working principally under compression, wherein said block is subdivided by at least one intermediate plate inclined with respect to the axis of the block at an angle greater than the angle of inclination of the end surfaces of the block, which allow the lateral rigidity of the springs to increase at least in a transverse direction when the spring is compressed.

The end surfaces of the rubber block are preferably inclined in parallel fashion and there is only one intermediate plate, this plate being located in the middle of the block and forming an angle of 90° with respect to the axis. When the spring comprises several intermediate plates, the plates between an end surface and the median plane are spaced at regular intervals and are inclined with respect to the axis with increasing angles between the angle of inclination of the said end face and 90°.

In a preferred embodiment of the invention, the spring comprises at least two primary rubber blocks located on either side of an axial plane, the support surfaces and the intermediate plates of the two blocks being inclined in the opposite direction with respect to the axial plane. The lateral tautening effect of the compressed spring thus is exerted in two opposite transverse directions.

Figure 2:
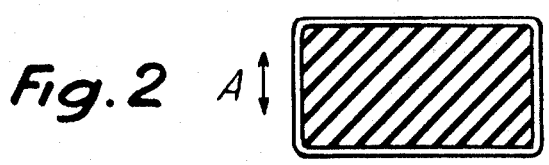
Figure 3:
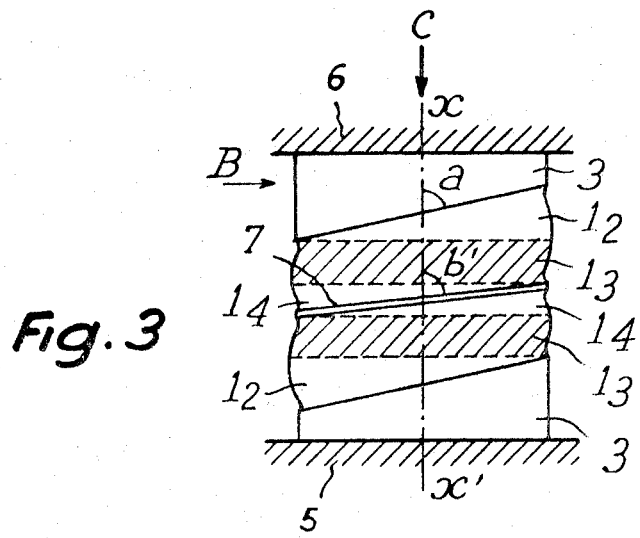
Figure 4:
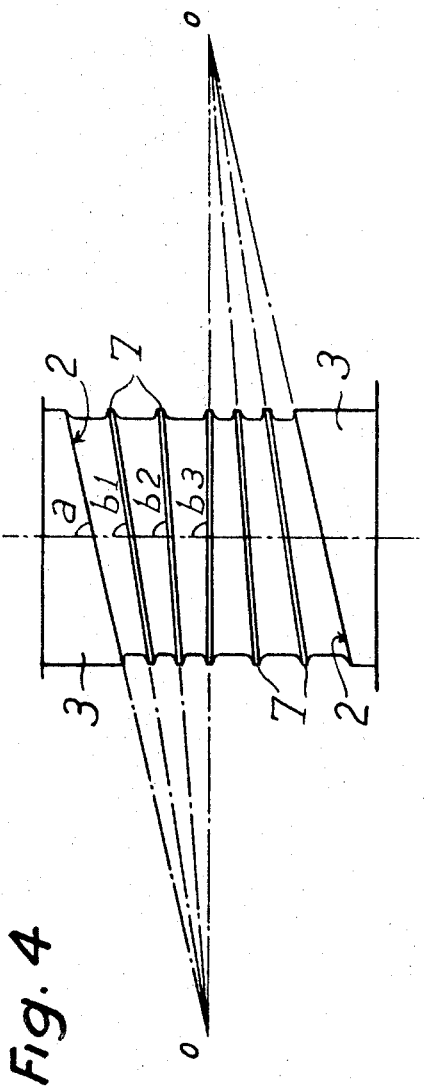
Figure 6:
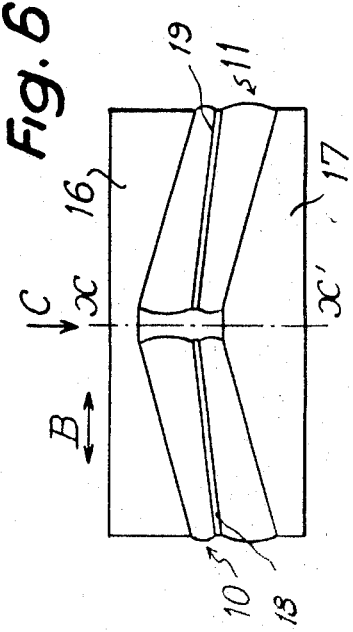
Figure 5:
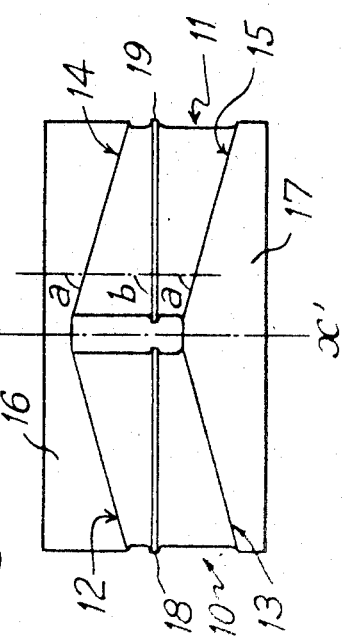

In order that the invention may be more clearly understood, reference will now be made to the accompanying drawings which show some embodiments thereof by way of example, and in which:

FIGS. 1 and 2 show schematic views in elevation and plan respectively, of a compression spring with one intermediate plate, in the unstressed state, FIG. 3 shows a view in elevation similar to FIG. 1 but showing the spring in the compressed state, FIG. 4 shows an elevational view of a spring with several intermediate plates, and FIGS. 5 and 6 are elevations showing a double spring in the unstressed and compressed states, respectively.

In the drawings, the springs are shown upright, in position to support a compressive stress, consisting of a load acting vertically, and they are described with reference to this upright position. It will be apparent, however, that they may be used in an inclined or recumbent position if the compressive stress acts along an inclined or recumbent direction.

In the case of FIGS. 1 to 3, the spring is formed from a rectangular section block of rubber and with a vertical axis $x$–$x'$ along which acts a load C to be supported. The block 1 has parallel end surfaces 2 inclined at an angle $a$ of less than 90° with respect to the axis $x$–$x'$, these surfaces being fixed by adhering, or at the time of vulcanization, to the adjacent opposed faces of two wedge-shaped members 3 which are vertically superimposed. The opposite outer surfaces of the wedges 3 are perpendicular to the axis $x$–$x'$ and they are secured mechanically or they rest simply on a support member 5 and on the member 6 to be supported.

In accordance with the invention, the rubber block 1 is subdivided in two equal parts by an intermediate plate 7 placed in the horizontal median plane and thus forming an angle $b$ of 90° with respect to the axis $x$–$x'$, i.e. an angle greater than the angle of inclination $a$ of the end surfaces 2.

When the spring is not under compression it has a certain transverse rigidity with respect to a stress directed horizontally in the direction B and tending to displace the wedges 3 horizontally with respect to one another. This transverse rigidity may be calculated, by first considering that a large part of the volume of the block corresponding to the horizontal portion comprising all the complete straight sections of the block (part $1_1$ hatched on FIG. 1) works theoretically in pure shear when the remaining part $1_2$ of the block adjacent to the inclined surfaces 2 are working under combined shear and compression in order to resist the stress B.

When the spring is compressed vertically by the load C (FIG. 3) both parts of the block 1 distort as FIG. 3 shows, by making the intermediate plate 7 pivot so that the angle of inclination $b'$ with respect to the axis $x$–$x'$ diminishes in order to approach the value of the angle of inclination $a$ of the end surfaces 2. At the limit, the plate 7 tends to position itself parallel to the faces 2. This pivoting movement of the plate 7 is due to the fact that the thickness in the vertical direction of each part of the block is variable between the inclined faces 2 and the plate 7 and this movement is easily understood when one knows that the resilience of the rubber under compression is a function which includes the square of the thickness of the compressed rubber. Consequently, the thinnest portion of the block bends proportionally more than the thickest portion and thus allow the plates 7 to pivot.

If the spring in this compressed state is subjected, moreover, to a lateral stress B, this stress is resisted on the one hand by the hatched parts $1_3$ of the rubber block working under pure shear and on the other hand by the other parts $1_2$ and $1_4$ of the block adjacent to the inclined end faces and to two opposite faces of the plate 7, these other parts working under combined shear and compression. It is thus apparent that under these working conditions, the inclination incurred by the plate 7 under the effect of the compression of the block replaces, in the part $1_4$ of the block, a functioning in pure shear by a functioning incombined shear and compression, which increases the transverse rigidity of the spring in the direction of the stress B. The inclination of the plate 7 being a function of the bending under compression and not of the load C, it is understood that the transverse tautening resulting from the inclination of the plate 7 increases with the load. This tautening effect may be predetermined in order to compensate completely or partially for the decrease in the transverse rigidity due to the compression of the rubber so that the total transverse rigidity of the spring in the direction B remains substantially constant for a range of loads satisfactory for the use envisaged. If necessary, a total transverse rigidity of the spring which increases at the same time as the load C may be obtained.

It will be noted also in the embodiments described that the horizontal rigidity of the spring in the transverse direction opposite to direction B and in the horizontal direction A, are not substantially influenced by the inclination of the plate 7 in the compressed spring. This may be an advantage in certain uses that if also a stiffening effect is desired in the other horizontal direction this may be obtained by using several similar springs suitably orientated in order to resist each effect in the desired direction.

FIG. 4 shows another embodiment of the invention in which the rubber block is subdivided by several intermediate plates 7, these plates being distributed regularly in such a way that the plates between an end plate 2 and the horizontal median plane have, with respect to the axis $x-x'$, angles of inclination $b_1$, $b_2$, $b_3$, which increase between the value of the angle $a$ of the said face 2 and 90°. As a result, these plates 7 are parallel in pairs and that the plates situated on the same side of the horizontal median plane are placed along planes concurrent with the median plane and with the plane of the face 2, the convergence points 0 of the said planes being opposite with respect to the axis $x-x'$ for both halves of the spring.

In the compressed state of the spring the inclination of the plates 7 alters and the plates 7 all become parallel to one another while reducing, as referred to previously, the proportion of the volume of rubber working theoretically in shear with respect to a transverse stress in the direction B for the benefit of the volume of rubber working under combined shear and compression.

FIGS. 5 and 6 show another embodiment of the invention in which the spring comprises two single rubber blocks 10, 11 similar to that of the spring of FIG. 1, these blocks being spaced transversely on both sides of the axial plane $x-x'$ containing the direction of action of the load C to be supported. The end faces of these blocks 10, 11 are inclined symmetrically in the opposite direction with respect to the axis $x-x'$ and they are fixed to surfaces correspondingly inclined in a very open V-shape 12—13—14—15 of the end members 16, 17. The opposite exterior faces of the end members are preferably plane and parallel so that they may be fixed respectively to the bearing member and to the load to be supported. The blocks 10, 11 are shown as each being subdivided by an intermediate plate 18, 19 forming at rest an angle of inclination of 90° with respect to the axis $x-x'$, i.e. an angle of inclination greater than the angle of inclination of the end surface of the block. It will be apparent that several intermediate plates may be used in each block 10, 11, if desired.

FIGS. 6 shows the same spring in the compressed state and it is apparent that the plates 7 incline symmetrically as they approach the inclination of the end surfaces of their block. With a spring of this type, the lateral rigidity of the compressed spring is increased in both directions opposite to the transverse direction B. However, the lateral rigidity of the spring in the perpendicular horizontal direction to the direction B (i.e. in the longitudinal direction A) is not substantially affected.

In a modification, a spring of the type of that shown in FIG. 5 may be made, in which the end faces 12, 13 are inclined in the opposite direction to the faces 14, 15 but not symmetrically with respect to the axis $x-x'$, which allows a differential stiffening effect to be obtained in both directions of the transverse direction B.

The springs described above can be used for various purposes for which the load C to be supported varies. By way of an example of use, the lateral support of railway vehicle bodies may be mentioned.

I claim:

1. A rubber compression spring comprising at least one rubber block fixed at its ends to bearing surfaces which are inclined with respect to the longitudinal axis of the block at an angle less than 90° in such a manner that said block supports the load whilst functioning primarily in compression, wherein the said block is subdivided by at least one intermediate rigid plate which has, when not under load, an angle of inclination, with respect to the said axis of the block, which is equal to or less than 90° and greater than the corresponding angle of said bearing surfaces with respect to the said axis, the said angle of inclination of the rigid plate decreasing when the spring is under load in a direction away from 90° with respect to the said axis which allows the lateral rigidity of the spring to increase, at least in a transverse direction, when the spring is compressed.

2. A spring according to claim 1, wherein the bearing surfaces of the rubber block are parallel.

3. A spring according to claim 1, which comprises an intermediate plate located in the center of said block and forming an angle of 90° with respect to the longitudinal axis of said block.

4. A spring according to claim 1, that comprises a plurality of intermediate plates, those of said plates that are located between an end face and the median plane of the spring having, with respect to the longitudinal axis, an angle of inclination that increases between the angle of inclination of said end face and 90°.

5. A spring according to claim 1, that comprises at least two rubber blocks spaced transversely on both sides of the axial plane containing the direction of action of the load, the end faces and the intermediate plates of the blocks being inclined in the opposite direction with respect to said axial plane to increase the lateral rigidity of the compressed spring in two opposite transverse directions.

6. A spring according to claim 1, wherein said spring has end members whose exterior faces are parallel and perpendicular to the axis of the block.

7. A spring according to claim 1, wherein said spring has end members whose exterior faces are parallel and perpendicular to the axial plane of said block.

UNITED STATES PATENT OFFICE
CERTIFICATE OF CORRECTION

Patent No. 3,593,981        Dated July 20, 1971

Inventor(s) JOACHIM TANK

It is certified that error appears in the above-identified patent and that said Letters Patent are hereby corrected as shown below:

[73] Assignee  PNEUMATIQUES, CAOUTCHOUC MANUFACTURE ET
PLASTIQUES KLEBER-COLOMBES, COLOMBES,
FRANCE Signed and sealed this 23rd day of November 1971.

(SEAL)
Attest:

EDWARD M. FLETCHER, JR.                ROBERT GOTTSCHALK
Attesting Officer                       Acting Commissioner of Patents